United States Patent [19]

Hikawa et al.

[11] Patent Number: 5,247,371
[45] Date of Patent: Sep. 21, 1993

[54] IMAGE PROCESSING SYSTEM USING JOB CONTROL SHEETS WITH ATTRIBUTES

[75] Inventors: Yuji Hikawa; Toshio Kurogane, both of Kanagawa, Japan

[73] Assignee: Fuji Xerox Co., Ltd., Tokyo, Japan

[21] Appl. No.: 595,213

[22] Filed: Oct. 10, 1990

[51] Int. Cl.⁵ .......................................... G03G 15/00
[52] U.S. Cl. .................................... 358/448; 355/200
[58] Field of Search ............. 358/401, 442, 434, 435, 358/436, 452, 467, 468, 474, 488, 496, 440, 448; 382/7, 37, 38; 355/200, 202, 213

[56] References Cited

U.S. PATENT DOCUMENTS

| | | | |
|---|---|---|---|
| 4,248,528 | 2/1981 | Sahay | 271/258 |
| 4,352,012 | 9/1982 | Verderber et al. | 358/440 |
| 4,757,348 | 7/1988 | Rourke et al. | 355/200 |
| 4,970,554 | 11/1990 | Rourke | 355/200 |
| 5,051,779 | 9/1991 | Hikawa | 355/200 |
| 5,124,748 | 6/1992 | Tanabe et al. | 355/200 |

Primary Examiner—Edward L. Coles, Sr.
Assistant Examiner—Jerome Grant, II
Attorney, Agent, or Firm—Finnegan, Henderson, Farabow, Garrett & Dunner

[57] ABSTRACT

Disclosed is an image processing system in which an input image read from a document is subjected to image processing on the basis of machine operation indicating information defined in a job control sheet, to thereby obtain an output image. The job control sheet having specific marks or patterns arranged at its four corners so as to be point symmetrical with each other for discriminating the job control sheet from a document. The specific marks are comprised of attributes which are different in part for each of the specific marks.

15 Claims, 7 Drawing Sheets

IMAGE PROCESSING SYSTEM USING JOB CONTROL SHEETS WITH ATTRIBUTES

BACKGROUND OF THE INVENTION

1. Field of the Invention

The present invention relates to an improvement in an image processing system using a paper user interface and a job control sheet.

2. Discussion of the Related Art

An image processing system using a paper user interface is disclosed in the specification of U.S. Pat. No. 4,757,348. This image processing system uses a job control sheet having sheet detection marks printed on its four corners. The sheet detection marks contain information representing the contents of the image processing job. It is therefore necessary to use a job control sheet having a one-to-one correspondence with the contents of the image processing job. Consequently, a user has to prepare so many kinds of job control sheets that the efficiency of an image processing system using a paper user interface is significantly reduced.

Further, when a desired processing job is input into an image processing system by utilizing a job control sheet, the ease with which a user can manipulate the job control sheet is an important consideration. Hence, the performance of the image processing system is reduced because of the use of the job control sheet.

SUMMARY OF THE INVENTION

The present invention has been made in view of the above circumstances and has an object to provide an image processing system using a job control sheet in which the contents of a job desired by a user can be designated by marking.

Additional objects and advantages of the present invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the object and in accordance with the purpose of the invention, as embodied and broadly described herein, an image processing system is provided that comprises means for receiving input image data of a document and a corresponding job control sheet having specific marks arranged at its four corners such that the job control sheet may be discriminated from a document, wherein the specific marks are comprised of attributes which are different in part for each of the specific marks, and means for processing the image data in accordance with job information contained on the job control sheet to obtain an output image.

The job control sheet can be discriminated immediately after initiation of scanning because the sheet detection marks are arranged on the four corners of the sheet, and the sheet can be read from any direction because the sheet detection marks are arranged so as to be point symmetrical with each other. Further, since each of the marks is made to have different attribute information indicating, for example, a scanning direction such as a longitudinal forward direction, a longitudinal reverse direction, a transverse forward direction, or a transverse reverse direction, it is possible to reduce processing time for determining the job contents defined in the designation section of the job control sheet.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings.

DETAILED DESCRIPTION OF THE PREFERRED EMBODIMENT

Figure 1:
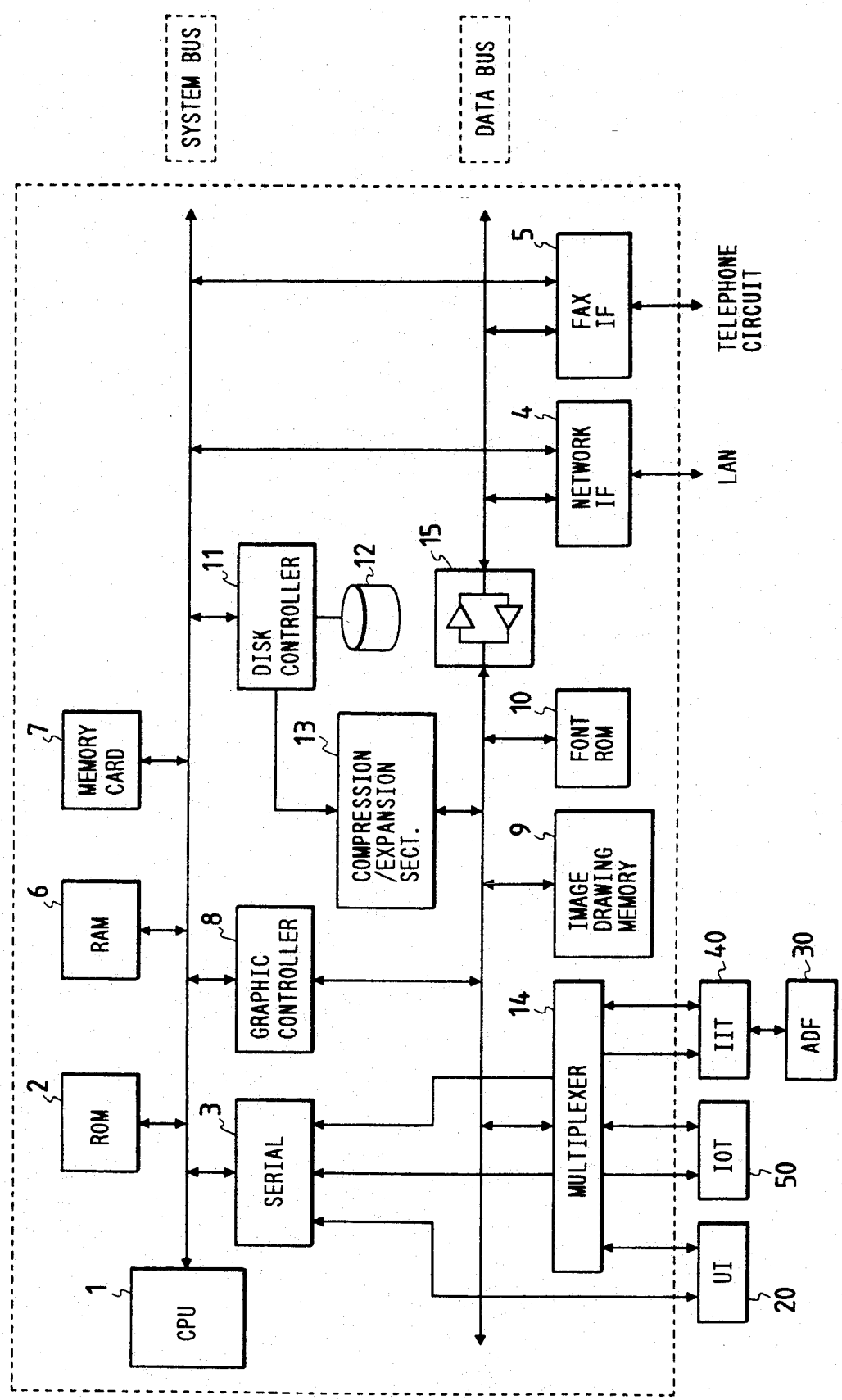
FIG. 1 is a block diagram showing the control circuit of the image processing system using a paper user interface which constitutes a preferred embodiment of the present invention.

An embodiment of the present invention will be described with reference to the accompanying drawings hereafter. FIG. 1 is a block diagram showing the control circuit of the image processing system using a paper user interface, which constitutes a preferred embodiment of the present invention. A CPU 1 executes a control program stored in a ROM 2 which performs image processing on image information input from various input devices to form output image information. The CPU 1 than transmits the output image information to either another image processing system through an image output terminal (IOT) 50 of a first image processing system, a network circuit LAN or to a facsimile machine through a telephone circuit. The input image information includes information for indicating machine operation defined in a job control sheet, image information of a document, and ID information of a user. The output image information includes not only output image information of the document but output image information of a modified job control sheet.

The input device includes, a user interface (UI) 20, such as a control panel, a keyboard, a mouse, and the like, of the first image processing system; an image input terminal (IIT) 40 of the first image processing system for reading a job control sheet and a batch of documents to hard disk 12. (hereinafter simply referred to as a "batch") set on an automatic document feeder (ADF) 30; and other image processing systems (not shown) connected to the first image processing system through a network circuit and a telephone circuit.

The input image information of a job control sheet is received by the CPU 1 thorough a serial input/output device (I/O) 3 and interfaces (IFs) 4 and 5. This information indicates the document setting direction as supplied from sheet detection marks and job attribute information such as the size and number of sheets of paper, an address, and the like. The job attribute information is recognized and stored in a back-up RAM 6 and a memory card 7 together with the ID information of the corresponding job. At the same time, a graphic controller 8 is activated to execute a format generation task stored in the ROM 2. That is, an image is drawn on an image drawing memory 9 on the basis of input image information received by a data bus through either a multiplexer 14 or the interfaces 4 and 5 and a gate 15. Characters are then read from a font ROM 10 and written into the image drawing memory 9, so that an image pattern of the job control sheet is generated. The graphic controller 8 also acts on the input information of the document in the same manner as on the input information of the job control sheet to thereby generate an image pattern of the document on the image drawing memory 9.

The image patterns thus generated are stored, as image data, in a hard disk 12. Under the control of a disk controller 11, image data generated in the first image processing system or image data supplied from another image processing system is compressed in a composition/expansion section 13, and the compressed data is stored in the hard disk 12. The compressed image data stored in the hard disk 12 is then expanded in the compression/expansion section 13, and the expanded data is supplied to the data bus.

Figure 2:
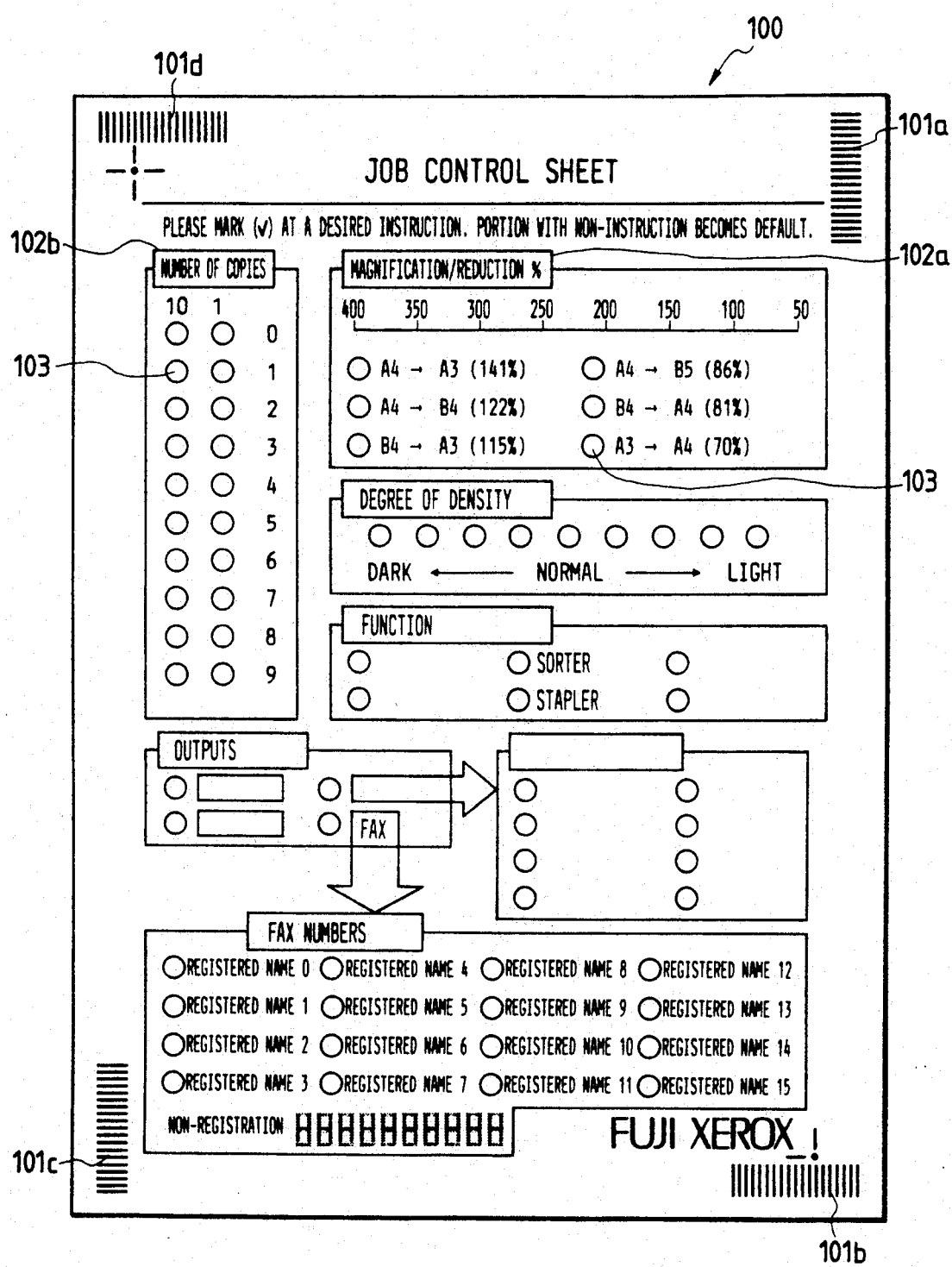
FIG. 2 is a diagram showing an example of the job control sheet.

FIG. 2 shows the format of a job control sheet. The job control sheet 100 has sheet direction marks 101a-101d indicting sheet attributes different from each other which are arranged at its four corners so as to be point symmetrical with each other. Job control sheet 100 further has job control designation sections 102a, 102b, ... in a region inside the sheet detection marks 101a-101d, as shown in FIG. 2. Each of the job control designation sections 102a, 102b, ... has check boxes 103 for checking the desired job attributes.

The job control sheet 100 can be discriminated immediately after initiation of scanning because the sheet detection marks 101a-101d are arranged at the four corners of the job control sheet 100, and the sheet 100 can be read from any direction because the marks 101a-101d are arranged so as to be point symmetrical with each other. Each of the marks 101a-101d includes information indicating the sheet attributes, for example, a scanning direction such as a longitudinal forward direction, a longitudinal reverse direction, a transverse forward direction, or a transverse reverse direction. For example, when the longitudinal and transverse directions are represented by "0" and "1" respectively and the forward and reverse directions are represented by "0" and "1" respectively, this orientation attribute of the sheet detection mark can be expressed by 2 bits. That is, the longitudinal forward direction of the sheet is represented by "00"; the longitudinal reverse direction, "01"; the transverse forward direction, "10"; and the transverse reverse direction, "11".

Figure 4:
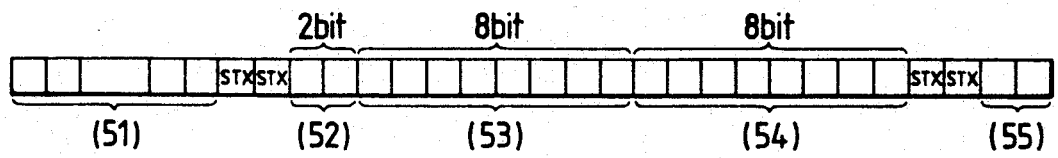
FIG. 4 is a diagram for explaining bar code information as an example of the sheet detection mark.

FIG. 4 shows an example of the attributes indicated by a bar code information. The attributes indicated by the bar code information are arranged in the following order; a detection synchronizing CLK attribute 51, two STX bits, an orientation attribute 52, a paper size information attribute 53 of the job control sheet, a sheet number information attribute 54 of the job control sheet, and a parity check 55. The orientation attribute 52 is constituted by two bits. The first bit indicates the longitudinal/transverse direction of the sheet, and the second bit indicates the forward/reverse direction of the sheet.

The job control sheet is designed so that the attributes of the sheet orientation and the paper size of the job control sheet can be discriminated in the first ten bits. Therefore, it is possible to detect the size and scanning direction of the job control sheet which can be scanned quickly and easily.

Figure 9:
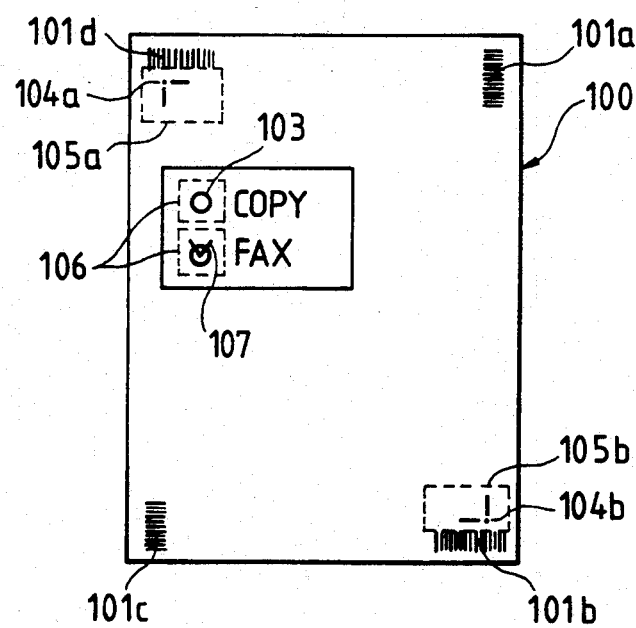
FIG. 9 is a diagram for explaining search area.

Further, as shown in FIG. 9, image coordinate origins 104a and 104b necessary for recognizing the sheet 100 are provided in the job control designation sections 102. By the provision of such origins 104a and 104b, the image processing system according to the present invention can still effectively operate even when the job control sheet 100 is skewed.

Figure 5:
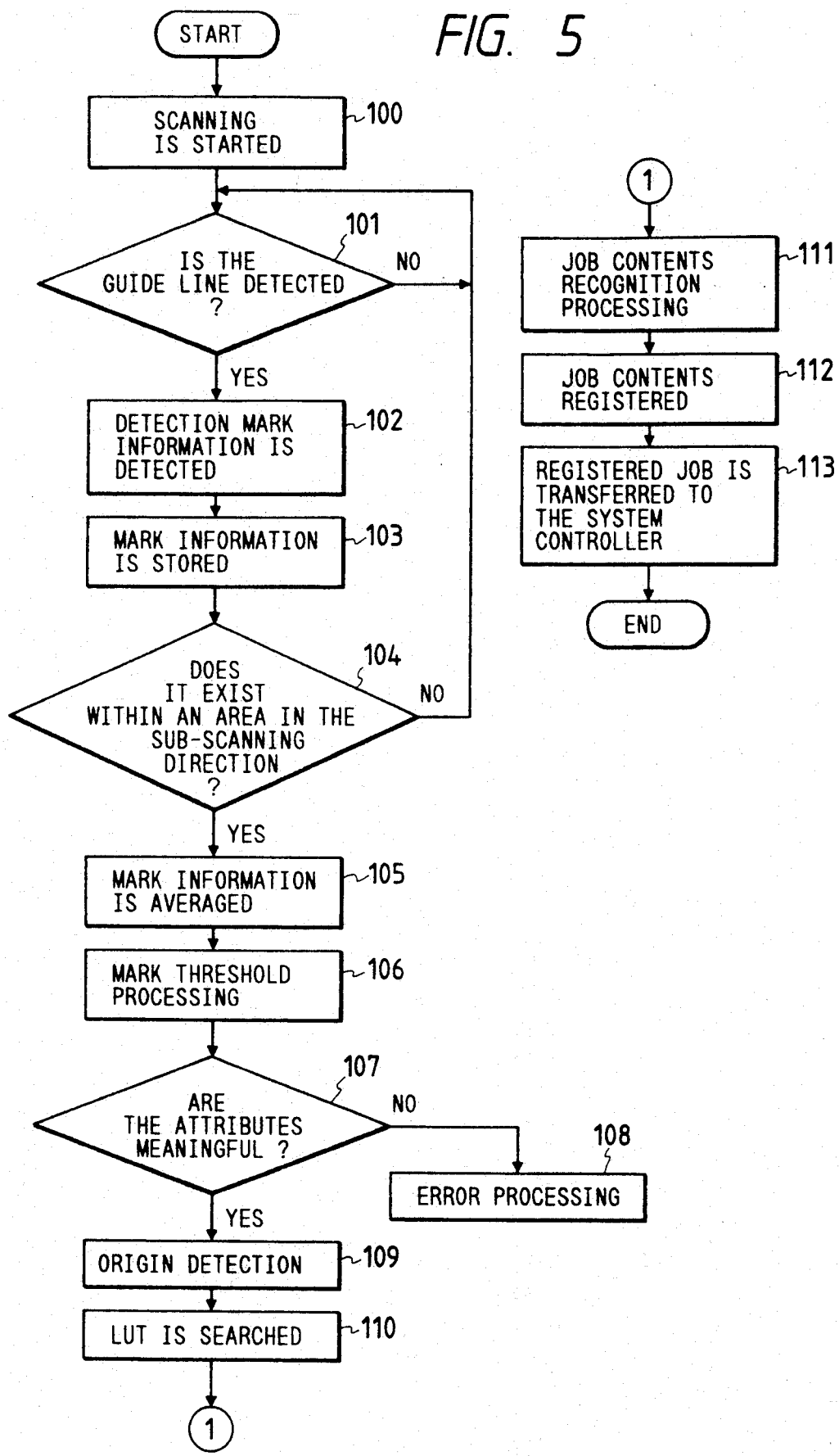
FIG. 5 is a flowchart for executing the processing for recognizing the job control sheet.
Figure 8:
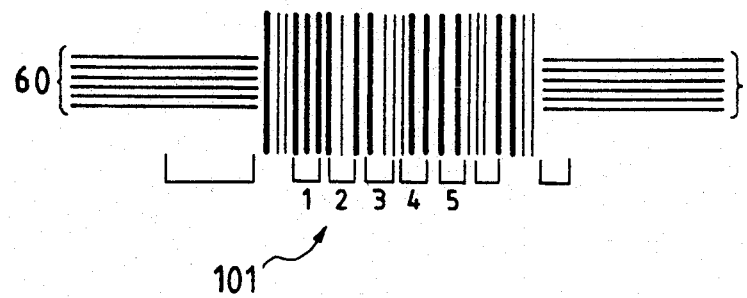
FIG. 8 is a diagram for explaining detection of bar code information.

FIG. 5 is a flowchart for executing the processing for recognizing the job control sheet. When scanning is started (in step 100), detection of sampling guide lines 60 of a sheet detection mark 101a-101d shown in FIG. 8, is checked (in step 101). Bar code information including the parity check of FIG. 4 (that is, the sheet detection mark information) is detected along the guide lines 60 (in step 102), and the mark information detected for every guide line 60 is stored (in step 103). Then, a determination is made as to whether the detected mark information exist within an area in the sub-scanning direction of the sheet detection mark (in step 104). If the detected mark information does exist within the described area, the stored code information is averaged (in step 105), and threshold processing of the averaged mark information is performed (in step 106), so that encoding is completed.

Next, a determination is made as to whether the detected attributes are meaningful or not (in step 107). If the attributes are meaningless, that is, a fatal error is generated, error processing is performed (in step 108). If the attributes are meaningful, the origins are detected from the attributes (the longitudinal/transverse direction, the forward/reverse direction, and the paper size) (in step 109). When the detection of the origins is completed by using an origin detection routine (which will be described later), a look-up table (LUT) is searched on the basis of the sheet number (in step 110). Next, job contents are searched for in the LUT on the basis of the origins by using a job contents recognition processing routine (which will be described later) (in step 111). The recognized job contents are registered (in step 112), and transferred to the system controller which controls the operation of the first image processing system (in step 113).

Figure 6:
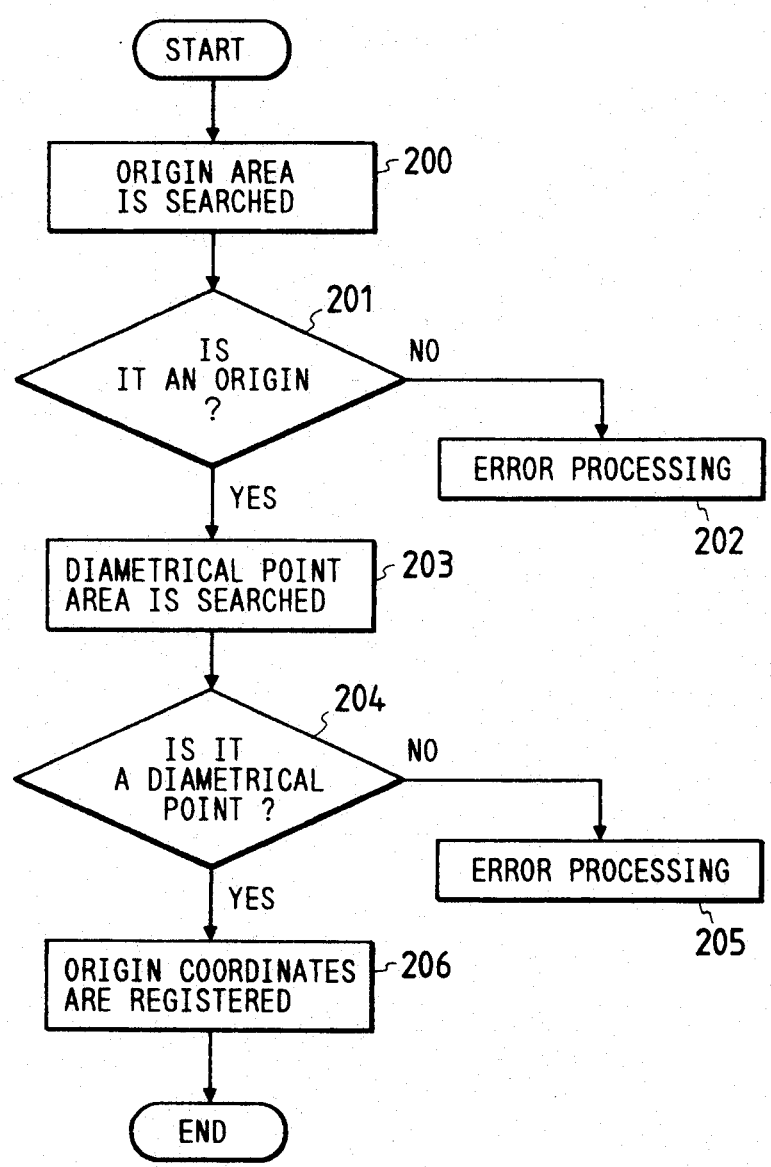
FIG. 6 is a diagram for explaining the origin detection routine.

FIG. 6 is a flowchart for executing the processing for detecting the origin (or a diametrical point) on the basis of the attributes of the detected sheet detection mark. In this detection system, an origin area 105a or a diametrical point area 105b is set as a relatively narrow area including an origin 104a or a diametrical point 104b, respectively, as shown in FIG. 9, and the origin 104a or the diametrical point 104b is detected by searching only in these areas. When attributes such as the reading direction, the size, and the like, or the job control sheet 100 are detected from the sheet detection mark 101a-101d, the origin area 105a or the diametrical area 105b to be searched on the basis of the attributes is set, and the search in the area is started (in step 200). The origin 104a is searched for on the basis of the data obtained in the set area (in step 201). If the origin 104a is found in the processing of step 201, the search for the diametrical point area 105b is started (in step 203). The search for the diametrical point 104b is performed on the basis of the data obtained by the search in the same manner as in the search of the origin 104a (in step 204). If the diametrical point 104b is found in the processing of the step 204, origin coordinates are registered (in step 206). If the origin 104a and the diametrical point 104b are not found in the search areas 105a and 105b in the processing of steps 201 and 204, respectively, error processing 202 or 205 is performed. In this case, the coordinates represent absolute coordinates in the memory.

In the origin detection system in this embodiment the specific search area is narrower than that of the system for detecting the whole job control sheet so that the detection time can be reduced.

Figure 7:
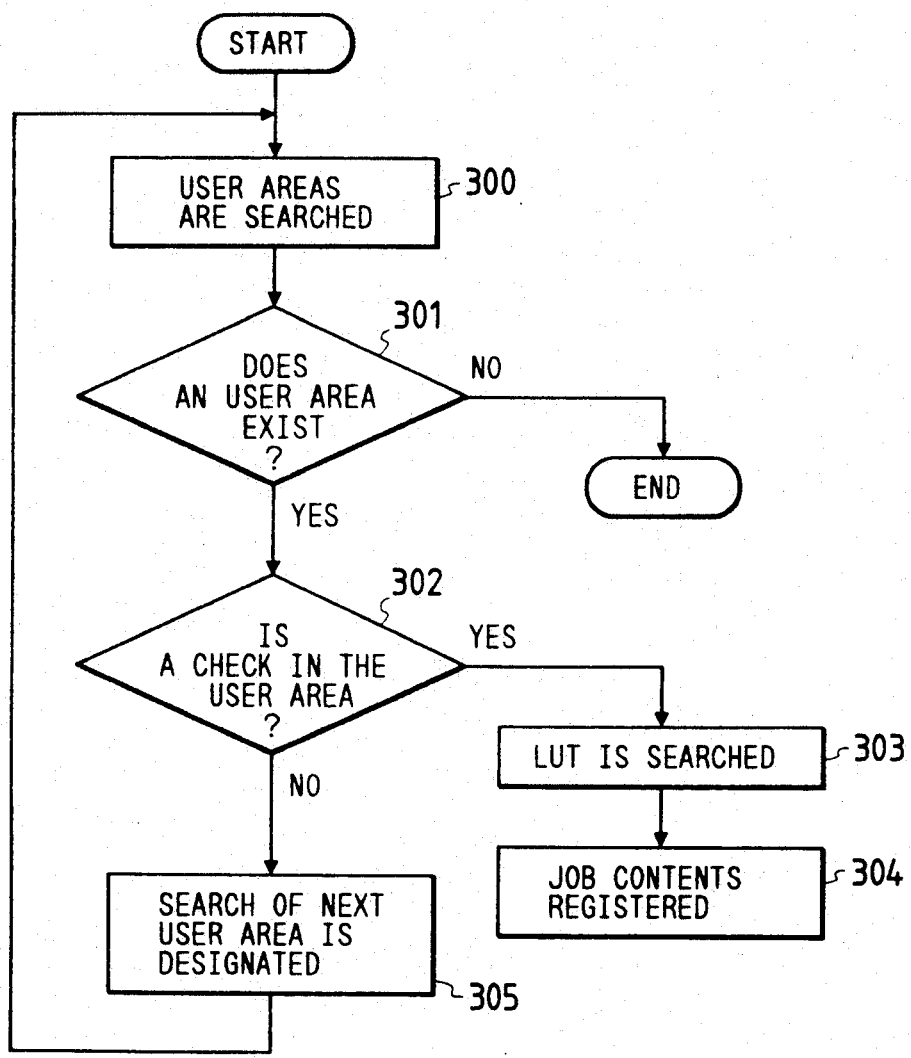
FIG. 7 is a diagram for explaining the job contents recognition routine.

FIG. 7 is a flowchart for recognizing job contents. The areas for the user's check boxes 103 are stored in the LUT as relative coordinates from the origin 104a. The search for the user areas 106 shown in FIG. 9 is started on the basis of the relative and origin coordinates (in step 300).

Next, a determination is made as to whether a user area to be searched exists or not (in step 301). If no user area to be searched exists, the processing is terminated. If a user area to be searched does exist, then a determination is made as to whether a check mark 107 or some other user marking has been detected in the area (in step 302).

For example, when a check mark exists in the user area for designating a facsimile job as machine operation indicating information, as illustrated in FIG. 9, the job contents corresponding to the user area, that is, a facsimile job, is searched for in the LUT (in step 303), and the job contents of the facsimile job are registered (in step 304). If the user area searched in step 302 corresponds, for example, to a copy job, it is determined that no check mark exists. After it is determined that no check mark exists or after the job contents have been registered in step 304, initiation of a search of the next user area is designated (in step 305).

Figure 3:
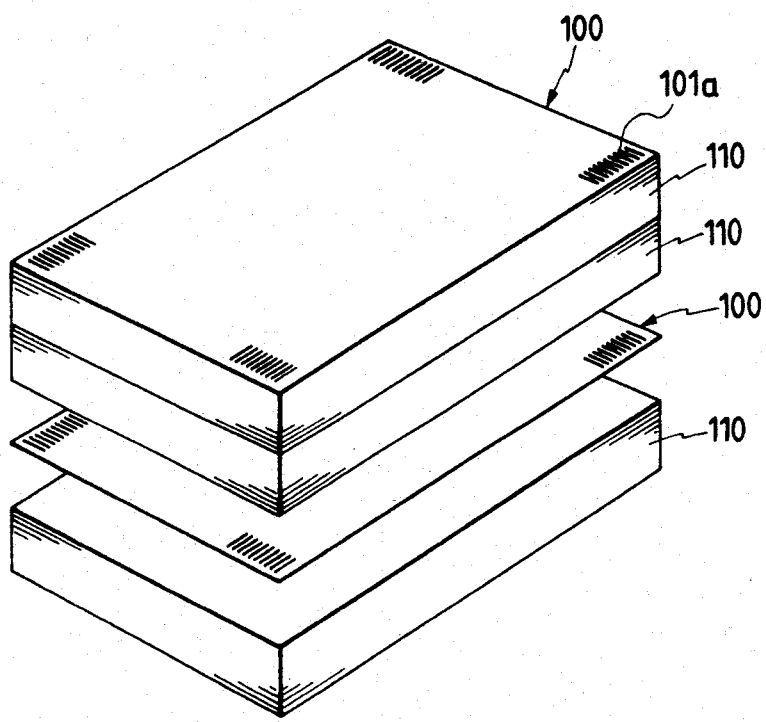
FIG. 3 is a diagram for explaining the batch processing.

A user designates a desired job by checking the check boxes of the job control sheet, for example, by blackening-in the check box or drawing x marks, and puts the job control sheet on a batch of documents as shown in FIG. 3. When the batch of documents is set on the automatic document feeder (ADF), the batch is sent to the image input terminal (IIT) successively from the job control sheet. The image input terminal (IIT) converts images of the job control sheet and the documents successively into electric signals, that is, input image information. The input image information is stored in the image drawing memory through the multiplexer. Further, if the CPU recognizes the sheet detection marks from the input image information, the CPU determines that the image which is being scanned is that of the job control sheet, and executes processing for recognizing the job contents of the job control sheet. If the CPU determines that the image is that of a document rather than that of the job control sheet, the CPU does not execute the processing for recognizing the job contents.

The image coordinate origins are searched for on the basis of the attributes recognized from the sheet detection marks, and recognition of the job contents is started on the basis of the origins and the sheet number. Look-up tables (LUT) suitable for recognition of job contents performed on the basis of the sheet number are prepared in advance in the hard disk by the number corresponding to the type of job control sheet. In the LUT, a job to be performed is defined on the basis of the image of the job control sheet itself and the coordinates of the user check portion. Therefore, in the job content recognition processing, relative coordinates from the image coordinate origin to the position checked by the user are calculated, and the LUT is searched on the basis of the relative coordinates, so that a job to be performed is detected. The detected job is performed with respect to documents succeeding the job control sheet. For example, when the detected job is to be outputted from the first image processing system, image data of the document is read from the image drawing memory, and supplied to the image output terminal IOT. Further, when the job is to be performed in a facsimile machine or another work station, the interface corresponding to the facsimile machine of the other work station is operated so that the output image information is transmitted.

As described above, according to the present invention, the sheet detection mark can be made to have the number, the direction of the job control sheet, and the like, as the attributes of the sheet, and therefore time required for detecting origin information of the job control sheet designation section is reduced. Further, since the sheet detection mark can be commonly used, the job control designation section can be defined in any desirable manner.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing system comprising:
    means for receiving input image data including image data representing a document and image data representing a corresponding job control sheet, the job control sheet containing job control information and four groups of specific marks, each group arranged at a corner of the job control sheet point symmetrical with the other groups, the specific marks being comprised of attributes which are at least partially different for each group of specific marks;
    first processing means for processing the image data to detect image data representing the specific marks and for designating image data associated with the image data representing the specific marks as image data representing the job control sheet; and
    second processing means for processing the image data representing the job control sheet to obtain the job control information and for processing the image data representing a corresponding document according to the job control information to obtain an output image.

2. The image processing system of claim 1, wherein the second processing means processes the image data representing the job control sheet to obtain the job control information according to the attributes of the detected specific marks.

3. The image processing system of claim 2, wherein the second processing means comprises means for processing the image data representing the job control sheet according to attributes of the detected specific marks with both longitudinal and transverse orientation of the job control sheet.

4. An image processing system comprising:
   means for receiving input image data including image data representing a document and image data representing a corresponding job control sheet, the job control sheet containing job control information and four groups of specific marks, each group arranged at a corner of the job control sheet point symmetrical with the other groups, the specific marks being comprised of attributes which are at least partially different for each group of specific marks;
   first processing means for processing the image data to detect image data representing the specific marks and for designating image data associated with the image data representing the specific marks as image data representing the job control sheet; and
   second processing means for processing the image data representing the job control sheet to obtain the job control information and for processing the image data representing a corresponding document according to the job control information to obtain an output image, wherein the second processing means processes the image data representing the job control sheet to obtain the job control information according to the attributes of the detected specific marks with both longitudinal and transverse orientation of the job control sheet, and wherein the second processing means comprises means for extracting attributes of at least one detected specific mark, including a relative page orientation attribute defining the layout of the job control sheet relative to the position of the at least one detected specific mark.

5. The image processing system of claim 2, wherein the job control information on the job control sheet includes requested operations indicated by a user.

6. The image processing system of claim 5, wherein the second processing means comprises means for determining requested job control operations by detecting image data representing the presence of indication mark in a check box corresponding to the operation on the job request sheet.

7. An image processing system comprising:
   means for receiving input image data including image data representing a document and image data representing a corresponding job control sheet, the job control sheet containing job control information and four groups of specific marks, each group arranged at a corner of the job control sheet point symmetrical with the other groups, the specific marks being comprised of attributes which are at least partially different for each group of specific marks;
   first processing means for processing the image data to detect image data representing the specific marks and for designating image data associated with the image data representing the specific marks as image data representing the job control sheet; and
   second processing means for processing the image data representing the job control sheet to obtain the job control information, the job control information including requested operations indicated by a user, and for processing the image data representing a corresponding document according to the job control information to obtain an output image, wherein the second processing means processes the image data representing the job control sheet to obtain the job control information according to the attributes of the detected specific marks, and wherein the second processing means comprises means for determining requested job control operations by detecting image data representing the presence of an indication mark in a check box corresponding to the operation on the job request sheet and for obtaining instructions corresponding to the requested job control operation from a look-up table.

8. The image processing system of claim 1, wherein the specific marks are bar codes.

9. An image processing system comprising:
   means for receiving input image data including image data representing a document and image data representing a corresponding job control sheet, the job control sheet containing job control information and four groups of specific marks, each group arranged at a corner of the job control sheet point symmetrical with the other groups, the specific marks being comprised of attributes which are at least partially different for each group of specific marks, wherein the attributes include a paper size attribute;
   first processing means for processing the image data to detect image data representing the specific marks and for designating image data associated with the image data representing the specific marks as image data representing the job control sheet; and
   second processing means for processing the image data representing the job control sheet to obtain the job control information, the job control information including requested operations indicated by a user, and for processing the image data representing a corresponding document according to the job control information to obtain an output image.

10. The image processing system of claim 1, wherein the attributes include a paper number attribute.

11. The image processing system of claim 1, wherein the attributes include a parity check attribute.

12. An image processing system comprising:
   means for receiving input image data of a document and a corresponding job control sheet having a group of specific marks arranged at its four corners such that the job control sheet may be discriminated from a document, wherein the specific marks are comprised of attributes which are different in part for each of the groups of specific marks;
   means for reading at least one of the groups of specific marks;
   means for searching for and reading job information from the job control sheet according to the attributes of the specific marks read; and
   means for processing the image data in accordance with the job information contained on the job control sheet to obtain an output image.

13. The image processing system of claim 12, wherein the specific marks are arranged such that one of the marks may be read regardless of the longitudinal or transverse orientation of the job control sheet.

14. An image processing system comprising:

means for receiving input image data of a document and a corresponding job control sheet having a group of specific marks arranged at its four corners such that the job control sheet may be discriminated from a document, wherein the specific marks are comprised of attributes which are different in part for each of the groups of specific marks;

means for reading at least one of the groups of specific marks, wherein the specific marks are arranged such that one of the marks may be read regardless of the longitudinal or transverse orientation of the job control sheet;

means for searching for and reading job information from the job control sheet according to the attributes of the specific marks read, wherein the attributes include a relative page orientation attribute which defines the layout of the job control sheet relative to the position of the specific mark that is read; and means for processing the image data in accordance with the job information contained on the job control sheet to obtain an output image.

15. The image processing system of claim 12, wherein the job information on the job control sheet includes requested operations indicated by a user.

* * * * *